Sept. 5, 1939.  H. J. MURRAY  2,172,068
DIRECTION SIGNAL BLINKER SYSTEM
Filed May 7, 1935
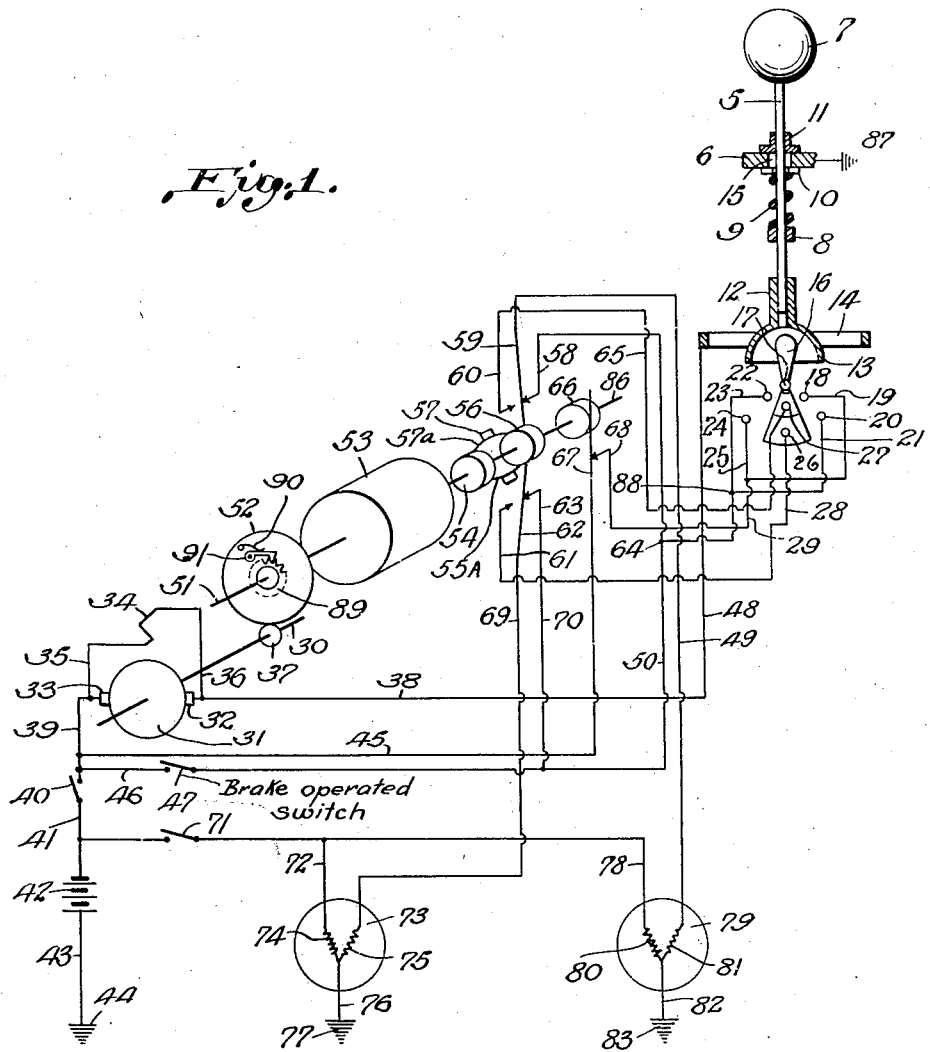
Inventor:
Howard J. Murray.

Patented Sept. 5, 1939

2,172,068

UNITED STATES PATENT OFFICE 2,172,068

DIRECTION SIGNAL BLINKER SYSTEM

Howard J. Murray, New York, N. Y.

Application May 7, 1935, Serial No. 20,207

8 Claims. (Cl. 177—339)

The invention relates in general to a multiple signalling device for use wherever such a device can be utilized and the invention specifically relates to a signalling device designed for use on an automotive vehicle for indicating to persons exterior of the vehicle certain intents of the operator, such for instance, as the intent to slow down, or to stop, and to turn to the left or right.

The primary object of the invention is to provide means for employing the same signal unit for indicating more than one intent of the operator to persons exterior of the vehicle.

Another object of the invention is to provide an intermittent or variable direction signal which may be controlled by the driver of the vehicle and when intermittent or varied action will continue automatically for an interval after the manual control has ceased.

Still another object of the invention is to provide in connection with right and left blinking indicating lights a point of reference, for instance, a different colored continuous light closely associated with the intermittent direction signal light, or a continuous light at a distance from the intermittent light so that the operator of the warned car will know that an intermittent light appearing to the right of the reference light would indicate to others an intent to turn to the right and correspondingly an intermittent light appearing to the left of the reference light would mean an intent of the operator to turn to the left. It is herein suggested that these reference lights be the usual tail, stop or parking light as conventionally used on automotive vehicles, so that these lights will selectively perform dual functions.

An additional object of the invention is to provide in connection with the conventional stop lights usually found on the rear of automotive vehicles means to cause them to selectively blink or vary in intensity as a direction signal so that the stop lights will perform the dual function of stop lights and direction signal lights.

A still additional object of the invention is to provide means for permitting conventional signal lights as usually found on automotive vehicles to selectively blink or vary in intensity as direction signal lights, and at the same time function in the usual manner.

In addition the invention contemplates the employment of conventional elements as usually found on automotive vehicles whereby suitable control of current supply will selectively cause the said conventional elements to provide additional protection to the occupants of the vehicle without the addition of extra lamps, sockets, containers and with small additions to the conventional wiring connections.

In general the invention features the control of the conventional signals such as tail, stop or parking lamps, as now usually found on automotive vehicles so as to use same in a dual capacity to provide additional signals thereby to more clearly indicate to persons exterior of the vehicle the intentions of the operator of the vehicle.

Various other objects and advantages of the invention will be in part obvious from an inspection of the accompanying drawing and in part will be more fully set forth in the following particular description of one form of mechanism embodying my invention, and the invention also consists in certain new and novel features of construction and combination of parts hereinafter set forth and claimed.

In the drawing:

Figure 1 is largely a diagrammatic view of the arrangement of means embodying a preferred form of my invention and the necessary connections to properly complete a working circuit organization.

Figure 2 is a view partly in sectional elevation of the directional signal control means showing same at an operating position.

Figure 3 is a view partly in sectional elevation of the signal circuit control means showing same at a second operating position.

In the accompanying drawing there is shown more or less in diagrammatic form a preferred embodiment of my invention with the several mechanical parts shown symbolically together with the necessary electrical parts and connections, but it is obvious that the showing is merely suggestive and must be modified to meet the peculiar requirements of the different makes of vehicles upon which it is to be installed.

In the drawing there is also shown certain conventional parts now found in automotive vehicles. For instance, there is shown the source of electric energy 42 grounded on one side by means of conductor 43 as shown at 44, and the other side of which a battery current is led through the usual ignition control switch 40 by means of a conductor 41 to the conductor 39. There is also shown the usual double filament electric lamps 73 and 79 containing the conventional tail signal filaments 74 and 80 and the usual stop signal filaments 75 and 81. It is also assumed that the vehicle is equipped with the usual tail light switch 71 and the usual stop signal switch 47. In addition, it is assumed that the conductors 84 and 85 lead to conventional parking and/or head lamps (not shown).

In order to distinguish the lamps 73 and 79 from each other at a distance in foggy, cloudy, rainy weather or in darkness, it is suggested that the lamps 73 and 79 be positioned on opposite sides, considered horizontally of the vehicle in the usual conventional manner.

The present disclosure features the disposing of the direction signalling control device so as to be operatively energized by the usual ignition switch 40 so that the single act of turning the ignition switch 40 so as to turn on the ignition will simultaneously position the signalling system in condition to be operated, although it is obvious that they may be placed in any desired relative relation.

In order to provide a selective control for causing the conventional stop signal filaments 75 and 81 to function simultaneously as stop and direction signals or separately as stop or direction signals there is provided a manually actuated control shown in various operating positions in Figures 2 and 3 and operatively included in the circuit organization shown by Figure 1. This circuit control is provided with a rockable operating rod 5 positioned through the opening 15 in a rigid support 6 by the flanged collar 11 securely attached to the rockable rod 5. A bearing plate 10 positions a spring 9 coiled about the rod 5 normally compressed against a stop collar 8 securely attached to the rod 5. A bell shaped terminal 12 is adjustably positioned on the rod 5 to move with the rod 5 as the control ball 7 is manually actuated from its inoperative position.

When the manually actuated ball 7 is moved to the right or left to thereby rock the rod 5 and thus the circuit affecting terminal 12 so as to be intercepted by the terminal 14 and with the ignition switch 40 closed, current will flow through the conventional electric motor brushes 32 and 33 and armature 31 mounted on the motor shaft 30 and also through the motor field winding 34, the conductors 38 and 48 to contact 14, bell-shaped portion 13, terminal 12, stop collar 11, support 6 and to the ground connection 87.

If the terminal 12 is moved to the left by the movement of the ball so that the bell shaped portion 13 is intercepted by the handle 16 of a double-pole double-throw toggle switch including the terminals 18, 20, 27, 26, 22 and 24, the switch connecting blades of portion 16—A will be rocked to move so as to rotate about the pin 17 to the right to electrically connect the terminals 18 and 27, and 20 and 26. In the same manner when the terminal 12 and bell-shaped portion 13 is moved to the right the handle 16 will be moved to the right to cause the blades electrically to connect the terminals 22 and 27, and 24 and 26.

The motor shaft 30 is provided with a pinion 37 in driving relation with the driven member 52 loosely mounted on the shaft 86 and is connected to the said shaft 86 by means of the conventional pawl 91 and ratchet 89 operatively secured to the shaft 86.

A drum shaped mass 53 preferably formed of brass is mounted on the shaft 86 for rotation therewith, also mounted on the said shaft 86 is a fixed collar 54 provided with two spring centrifugal governor members 55—A and 57—A having weights 55 and 57 attached thereto for rotation therewith. The springs 55—A and 57—A are also attached to a slidable collar 56 positioned to normally move circuit closing elements 59 and 62 to the position shown in Figure 1 so as to be electrically connected to the terminals 58 and 63.

A cammed disc 66 is mounted electrically on the shaft 86 so that as the shaft 86 rotates the circuit closer 67 will be moved into and out of electrical contact with the terminal 68.

The motor, control switch, lamps, tail switch, stop switch, battery and the elements mounted on the shafts 30 and 96 are connected in desired circuit arrangement as hereinafter described.

In operation it will be understood that the conventional stop signals installed on the vehicle will normally function as stop signals upon the sequential manual operations of the conventional "stop" switch 47. When it is desired by the operator to selectively employ the "stop" filaments 75 and 81 as direction signals, the operator of the vehicle upon which the device is installed will operate the handle 7 to the right to move the rod 5 (say) to the left below the support 6 as an action prior to turning the vehicle to the right, this action will move the terminal 12 and the bell-shaped portion 13 to the left, and this action will throw the handle 16 of the toggle switch to the left and the circuit closing blades mounted on the lower portion 16—A to the right. With the same rocking movement the motor terminal 14 will intercept the portion 13 of the terminal 12 to close the motor circuit to the ground terminal 87 as hereinbefore described. Thus, current will be permitted to flow through conductors 44, 43, 41, (switch 40 when closed), brush 33, armature 31, brush 32, also conductor 35, field winding 34, conductor 36, conductors 38—48, terminals 14, 13 and 12, rod 5, and the various control switch parts as shown in Figure 1 to the ground connection 87. Thus, the motor armature 31 will be rotated and the shafts 30 and 86 will also rotate as long as the operator continues to hold the ball 7 the terminal portion 13 against the terminal portion 14. If the armature 31 rotates the shaft 30 counter-clockwise, the shaft 86 will therefore be rotated clock-wise as well as the portions mounted to rotate therewith.

With the shaft 86 at rest the closing of the brake switch 47 will cause battery current to flow through conductors 70, 63, 62 and 69, stop filament 75, conductor 76 to the ground 77 to energize the lamp filament 75 as a left stop signal. Current will also flow through conductors 50, 58, 59, 49, right stop filament 81, conductor 82 to ground connection 83 to energize lamp filament 79 as a right "stop" signal, thus the operation of the conventional brake or stop switch 47 by the operator of the vehicle will energize the conventional stop light filaments 75 and 81 in the usual manner. However, when the shaft 86 is sufficiently rotated the weights 57 and 55 will flex the centrifugal governor springs 57—A and 55—A outwardly to thereby pull the slidable collar 56 along the shaft 86 so that the circuit closers 59 and 62 will move away from the normally contacting terminals 58 and 63 and into electrical contact with the terminals 60 and 61. In this event, the current to energize the stop filaments 75 and 81 must now be obtained from the conductors 60 and 61 connected to common terminals 26 and 27 of the toggle switch. It will be seen that terminal 22 is connected by means of conductor 23 to the conductor 50 at the point 64 leading from the foot switch 47 and that terminal 24 is connected by conductors 25, 68, 67 and 45 to the battery 42 by means of the ignition switch 40. Now lead 19 connects terminal 18 to terminal 24 and lead 21 connects terminal 22 to terminal 20 as is usual in conventional reversing switches. Hence, it is obvious that as the toggle switch handle 16 is moved from one extreme position to the other by the movement of the ball 7 and thus the rod 5 that the lamp filaments 75 and 81 will be selectively placed in circuit with the circuit closer 67 whereby the operation of the ball 7 to the right will operate the blade member 16—A to the right to cause armature 31 to rotate the shaft 86 and thus the disc 66 to cause the current flowing through the filament 81 to be interrupted by the interrupter 67 so as to produce a flashing or varying light. In the same manner, the movement of the rod to the left will cause the current flowing through the filament to be interrupted by the element 67 to produce a flashing or varying light in the lamp 73.

Accordingly the selective operation of the control switch handle 7 to the left or right will cause the filament 75 to selectively flash in synchronism with the action of the circuit closer 67 when the rotating motor armature 31 has caused the weights 55 and 57 to move the collar 56 to move the circuit closers 59 and 62 to contact with the terminals 60 and 61 so as to function as a left direction signal.

If the ball 7 is moved to the right the motor armature will be rotated to operate the circuit closers 59 and 62 to place the stop filament 81 in circuit to be flashed as a right direction signal.

Now assume the vehicle to be in motion. The operator has closed the brake switch 47, causing current to flow from ground 44 through elements 43, 42, 41, 40, 46, 47, 50, 58, 59, 49, 81, 82 to ground 83. Also from 50, above, through elements 70, 63, 62, 69, 75, 76 to ground 77. This flow of current will cause both the filaments 75 and 81 to be constantly energized to indicate a conventional "stop" signal. Now the operator desires to turn to the right and accordingly operates the ball 7 to the right with the result that the switch lever contact 13 is moved into contact with the circular contact 14, thus permitting current to flow from ground 44 through the battery 42, through leads 39, 40 and 41, through the motor armature 31, field winding 34, brushes 32 and 33, leads 38 and 48, ring contact 14, contact 13, switch lever 5 to the ground 87, thus starting the motor and actuating the centrally affected weights 55 and 57 to move the member 56 along the shaft 51 to open the contacts 58 and 59, 62 and 63. At the same time the lever 16 will be rotated about its axis 17 to the left, thus closing the contacts 18 and 27, 20 and 26, and current will now flow from the ground 44 through the battery 42, leads 40, 41, 45 and 67 through the motor operated interrupter contact 68 actuated by the motor driven cam 66, and thus interrupted current will be conducted to the lead 19, through the contacts 18 and 27 to the contacts 60 and 59 to the filament 81 to the ground 83, with the result that the filament 81 flashes a right direction signal, and the filament 75 continues to indicate a steady stop signal provided that the stop switch 47 is still closed to conduct current to the point 64, point 88, conductor 21, contacts 20 and 26, lead 61, contacts 62 and 69 to the filament 75 to the ground 77. If the stop switch 47 is opened as the ball 7 is operated, the right filament 81 will continue to flash as the left filament will be de-energized and thus cease as a stop signal.

If the ball 7 is operated to the right with the stop switch 47 open, the right filament 81 will flash with filament 75 dead, but filament 75 will be lighted steadily by the closing of switch 47, without regard to the flashing action of the filament 81.

Hence, according to the present disclosure the conventional "stop" lights as usually found on automotive vehicles may be selectively employed to indicate a change in direction of motion as well as a change in rate of motion.

In the normal operation of the car the tail lamps will be lighted for night operation by the manual operation of the switch 71 to energize the filaments 74 and 80. The stop filaments 75 and 81 will be energized by the operation of the brake switch 47. The stop signals may be employed as direction signals by the selective operation of the ball 7 without regard to the status of the switches 71 and 47. But the tail filaments 74 and 80 will serve as reference lights at night for the direction signals when the switch 47 is open.

Thus, the operator of the car upon which the device is installed selectively indicates the change of rate of motion of the vehicle as he also selectively indicates his intention to change the direction of travel. Thus, the conventional double filament lamps 75 and 79 serve three purposes, and no additional lamp or sockets are required to obtain direction signals.

When the operator of the vehicle actually makes the turn he naturally uses both hands on the steering wheel and therefore can no longer hold the ball 7 to the right. When the manual pressure against the ball is released it will move from the position shown in Figure 2 for left signal to the position shown in Figure 3 and the terminal portion 13 will be moved away from the terminal portion 14 by the action of the compressed spring reseating 9 so that the supply of current to the armature 31 and field winding 34 is cut off and the motor will slow down. However, the motor in accelerating the mass 53 has stored power therein in the form of momentum and the shaft 86 will be permitted to continue to rotate by the over-running action of the pawl 91 and ratchet 89. Thus, the centrifugal action on the weights 55 and 57 on the springs 55—A and 57—A will continue to hold the circuit closer 59 against terminal 60, and circuit closer 62 against terminal 61 and the filament 81 will continue to indicate a change in direction of travel to the right without regard to the status of the switches 71 and 47 and with the operator's hand removed from the ball 7. As the speed of the mass 53 decreases the springs 55—A and 57—A will flatten out due to the decrease of speed of the moving parts initially rotated by the motor, and thus move the slidable drum 56 along the shaft 86 and therewith the circuit closer 59 will be moved from terminal 60 to terminal 58, and closer 62 will be moved from terminal 61 to terminal 63, and thus the flashing action of the breaker 67 will be removed from the stop filament circuits. Thus, the direction indication continues automatically for a predetermined time and thence automatically ceases. Thereafter, the conventional stop signals resume their normal operating status. The direction selector switch elements of member 16—A will remain in the operated position as long as the ball 7 is operated as shown in Figure 3, but when the ball 7 is operated to the left as shown in Figure 2, the lever 16 will be thrown in the opposite direction to again stay in that position until the ball 7 is operated in an opposite direction.

Thus, according to the present disclosure I provide a direction signalling system by employing the usual conventional signals in a dual capacity to normally act as stop signals when constant for desired periods, and selectively as direction signals when selectively made to flash or blink. Thus, no additional containers, lamps, sockets and very little additional wiring is required in addition to the conventional wiring.

It is obvious that the conventional tail lamp may be employed to flash as direction signals in place of the conventional stop lamp by the simple act of inserting the control switch of Figures 1, 2 and 3 in the tail lamp circuit instead of the conventional stop lamp circuit.

In any event, when 2 tail lamps or 2 stop lamps are a portion of the conventional equipment of an automotive vehicle either one of the stop or tail lamps may be caused to blink as a direction signal lamp as the other indicates the conventional signal. Thus, one stop lamp may intermittently flash as the other steadily indicates so that the operator may signal a change of direction of travel as he continues to indicate a change of rate of travel.

While I have shown and described, and have pointed out in the annexed claims, certain novel features of my invention, it will be understood that various omissions, substitutions and changes in the form and details of the device illustrated and in its operation may be made by those skilled in the art without departing from the spirit of the invention.

Having thus described my invention, I claim:

1. In a vehicle signalling system including means constituting a source of current and an energy storage device provided with centrifugally movable direction signal actuating circuit contacts, manually controlled motor means for actuating the said energy storage device, a current interrupter actuated by the said manually controlled motor means, a pair of signal lights mounted on opposite sides of the vehicle and visible from the rear thereof, circuit controlled means for selectively connecting the signal lights and the centrifugally operated contacts thereby to permit said centrifugally operated contacts to control the intermittent energization of one of the signal lights during and after the storage of energy in the moving portions of the said energy storage device.

2. In combination in an electric circuit, two circuit closers, one being biased to neutral position and the other having a plurality of settable positions, an electric motor and means for storing power taken from the said motor; means responsive to the selective manual closing action of the first named closer to operate the electric motor, a pair of electric lamps mounted on opposite sides of a vehicle and visible from the rear thereof, means responsive to the liberation of the said stored power and to the selective setting of the said second named closer in a settable position to act to control current to intermittently energize one of the lamps, and circuit means connecting the two said closers whereby the latter is operated to a settable position as a function of the selective manual operation of the former.

3. A signalling system comprising a source of current, a signal, and a motor driven flasher switch in series, a motor for said flasher switch and means to control the operation of said motor, and an inertia element coupled to said flasher switch whereby upon cessation of operation of said motor said inertia element will cause operation of said flasher for a predetermined interval.

4. A signalling system comprising a source of current, a signal, and a motor driven flasher switch in series, a motor for said flasher switch and means to control the operation of said motor, an inertia element coupled to said flasher switch whereby upon cessation of operation of said motor said inertia element will cause operation of said flasher for a predetermined interval, and means for disconnecting said motor and said inertia element as a function of their relative movement.

5. A vehicle signalling system comprising a source of current, a signal mounted on one side of the vehicle and visible from the rear thereof, a two position switch, and a motor driven flasher switch electrically in series, a motor for said flasher switch and means to control the operation of the said motor, and an inertia element coupled to said flasher switch and said two position switch whereby upon cessation of operation of said motor said inertia element will cause operation of said flasher and said two position switch in one of its positions for a predetermined interval of time and thence will return the said two position switch to the other of its operative positions.

6. In a signalling system, circuit control means including two selectively associated circuit closers, one of said closers having a biased position and two manually held positions and the other closer having two settable positions, a motor, means actuated by the motor including an energy storing inertia means and a plurality of current interrupting elements, said first mentioned closer adapted for supplying current to the motor to actuate the elements of the said interrupter, said second mentioned closer adapted for controlling the current interrupted according to the selective association of the said closers, and said inertia means adapted to actuate said interrupter for a predetermined time after the first circuit closer returns to the biased position.

7. A vehicle signalling system comprising a source of current, a signal light mounted on one side of the said vehicle and visible from the rear thereof, a motor, a current interrupter driven by the said motor, said interrupter being electrically in series with the said signal light and the said source of current, an inertia element for actuating the interrupter for a predetermined time after the supply of current to the said motor has ceased, means for disconnecting said motor and said inertia element as a function of their relative movement, and a centrifugal element acting to cut off the current supply to the interrupter.

8. In a combined stop and direction signal for vehicles, a stop light mounted on one side of the vehicle and visible from the rear thereof, means for causing said stop light to be continuously lit to thereby indicate a stop signal, means for causing said stop light to flash periodically to thereby indicate a direction signal, said second means comprising a manually operated motor, periodic circuit interrupting means operated by said motor and maintained in operation a predetermined time after the manual control of the motor has ceased, a centrifugally operated circuit controlling means operable to closed position by the operation of the motor and maintained in closed position a predetermined time after the manual control of the motor has ceased, and a circuit for said light including in series said circuit interrupting means and said centrifugal circuit controlling means.

HOWARD J. MURRAY.